Nov. 6, 1962 R. E. HURST 3,063,046
PORTABLE SELF-CONTAINED FLASHING WARNING SIGNAL
Filed June 28, 1961 2 Sheets-Sheet 1

INVENTOR.
Robert E. Hurst
BY
Gustave Miller
ATTORNEY

Nov. 6, 1962 R. E. HURST 3,063,046
PORTABLE SELF-CONTAINED FLASHING WARNING SIGNAL
Filed June 28, 1961 2 Sheets-Sheet 2
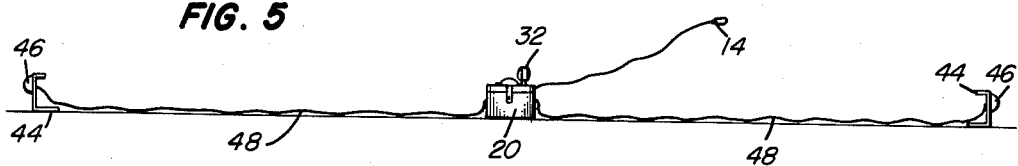
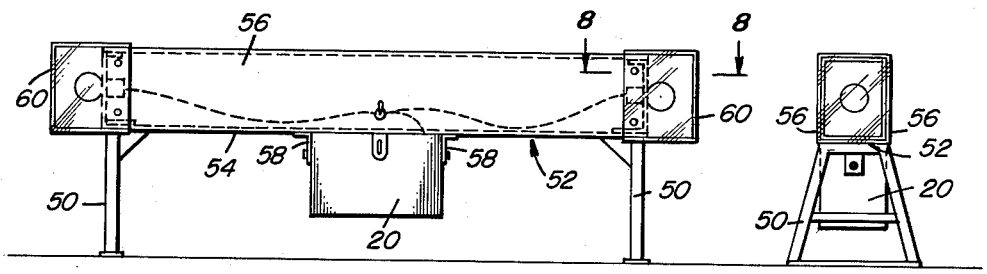
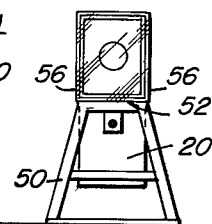
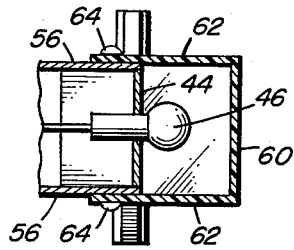
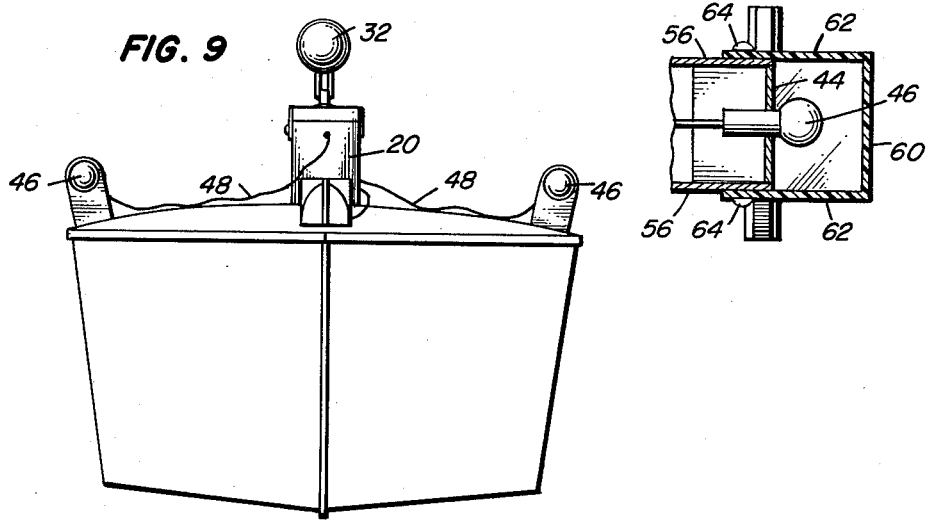
INVENTOR.
Robert E. Hurst
BY
Gustave Miller
ATTORNEY

United States Patent Office 3,063,046
Patented Nov. 6, 1962

3,063,046
PORTABLE SELF-CONTAINED FLASHING
WARNING SIGNAL
Robert E. Hurst, 4451 N. Sharp Road, Baton Rouge, La.
Filed June 28, 1961, Ser. No. 120,224
6 Claims. (Cl. 340—366)

This invention relates to a self-contained battery powered portable lighting unit having different light sources for multi-purpose use.

It is often necessary to provide a plurality of different types of light sources for various purposes such as a search or spot light, warning or flashing lights for boats, normally unpowered trailers or for warning lights on portable barricades. By this invention, a single carrying case for a battery is provided with the various lights, their connections and switches permanently assembled to the cover of the casing. It is then only necessary to insert the battery into the casing and detachably connect only two wires carried by the cover to the battery post and the cover locked to the casing so that the entire unit may be hand-carried to any desired location by a handle attached to the cover. Detachably carried by the casing are supports upon which extension lights connected to the lighting circuit are mounted, and an adjustable spot light may be mounted on the cover either in fixed or detachable relation thereto.

It is therefore an object of this invention to provide a portable self-contained battery powered lighting unit carrying a plurality of selectively operated lights.

Another object of this invention is to provide a battery carrying case upon which all of the circuit controls for various lights are mounted.

A further object of the invention is to provide a battery carrying case upon which all of the circuit controls and extension light sources are mounted and which are especially useful as a barricade warning system.

Still another object of the invention is to provide a novel portable barricade device which may be illuminated at night to provide a warning to automative or pedestrian travel.

With the above and related objects in view, this invention consists in the details of construction and combination of parts, as will be more fully understood from the following description, when read in conjunction with the accompanying drawings in which:

FIG. 5 is an end view of the battery casing with two of the lights connected to but extended away therefrom;

FIG. 6 is a front view of a barricade with the battery casing mounted thereon and the side lights extended to the opposite ends of the barricade;

FIG. 7 is an end view of the barricade;

FIG. 8 is a cross section along the lines 8—8 of FIG. 6; and

FIG. 9 is an end view of a boat with the portable lighting unit of the invention used as running lights therefor.

Figure 1:
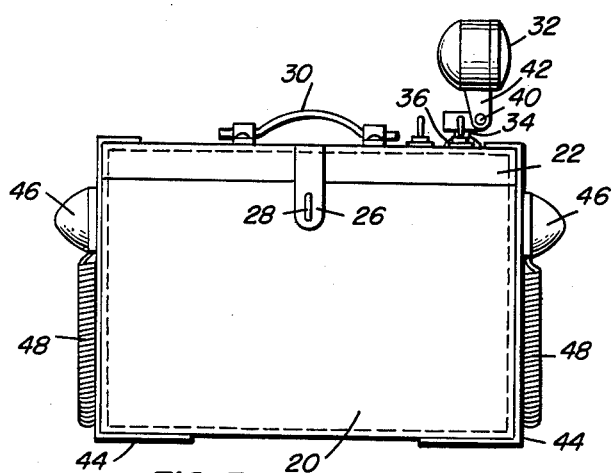
FIG. 1 is a side elevation of the battery case with the various light sources mounted thereon and the cover of the case in closed position.
Figure 2:
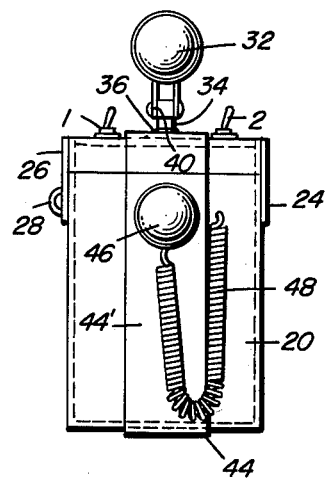
FIG. 2 is a front view of the battery case of FIG. 1.

The battery casing 20 of wood, metal or plastic is rectangular in shape and is of a size to house a conventional battery of the primary or secondary type. The casing has a bottom, side and end walls and a hinged cover or lid 22, the lid being mounted to one side wall of the casing by means of a hinge 24. A hasp 26 is hinged to the lid at the side opposite to the hinge 24 for receiving a locking hook member 28 secured to a side wall of the casing. A carrying handle 30 is mounted on the lid by means of straps in a conventional manner. A battery shown in dotted lines is mounted within the casing with its positive and negative terminals easily accessible when the lid is open.

Mounted on the exterior of the lid is a spot light indicated generally as 32. The spot light includes a vertical post 34 journaled in the bearing member 36 secured to the lid. The post carries a transversely extending head portion 38 to which is pivotally mounted, as by horizontal pivot 40, a holder 42 for the spot light lamp. As can be seen from this construction, the beam from the spot light can be moved both in azimuth and elevation.

Removably mounted on each end of the casing when the lid is closed, is a bracket or clamp 44 of stiffly resilient metal or plastic construction. The clamp member comprises a flat sheet 44' having its ends bent rearwardly at a 90° angle to provide a pair of spaced arms and is of such height that the clamp is resiliently held on the casing by the contact of the respective arms with the lid and bottom of the casing. The vertically extending wall 44' of each clamp and from which the arms extend, carries a lamp and housing therefor, generally indicated as 46. These lamps are each connected for energization by a pair of leads 48 which extend from within the cover or lid where they are connected in the lighting circuit as hereinafter described. The leads 48 each comprise a pair of conductors which are of coiled formation so as to be extensible as is conventional in the art, such that the lamps 46 can be extended to a distance from the case, the base of each of the clamps forming a stand for supporting the lamp carried thereby in upright position.

Figure 3:
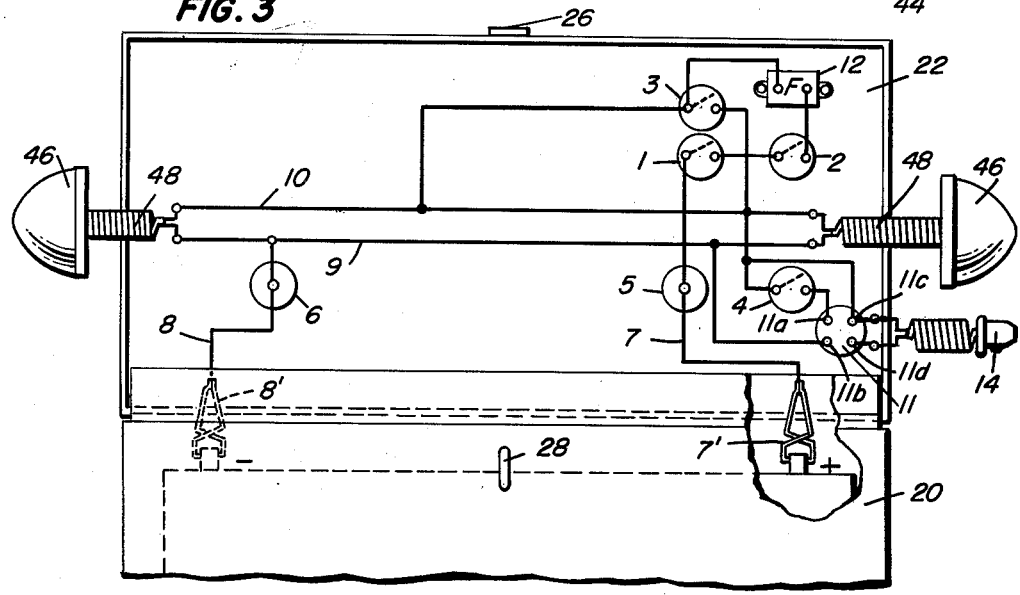
FIG. 3 is a view of the inside of the cover or lid of the battery case showing the circuit and control for the lamps.
Figure 4:
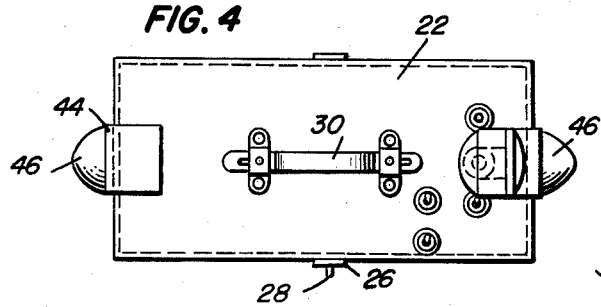
FIG. 4 is a plan view of the battery casing of the invention.

Mounted on the underside of the lid or cover 22 are the circuit components for controlling the energization of the lamps and as shown diagrammatically in FIG. 3. Secured to the inner surface of the cover are a pair of main terminals 5 and 6 to which are respectively connected leads 7 and 8 provided with battery clamps 7' and 8' for connection to the negative and positive terminals of the battery within the case 20. A connector 11 secured to the lid has openings through which the conductors for the spotlight 32 extend from the outer surface of the lid and terminals 11a and 11b to which they are soldered. Terminal 11b is directly connected to the negative terminal of the battery through lead 9 while terminal 11a is connected to the positive side of the battery through a pair of series connected switches 1 and 4. Switches 1 through 4 are mounted on the lid with their manual controls projecting from the lid and accessible from the exterior surface of the lid.

The conductors 48 for the extension lamps 46 extend through openings in the lid and are connected to conductors 9 and 10, conductor 9 being connected directly to one of the main terminals 6 while conductor 10 is connected to main terminal 5 through series connected switches 1 and 3. A flasher 12 of known type is also mounted on the lid with one terminal connected through series connected switches 1 and 2 to the positive main terminal 5 and its other terminal connected to conductor 10 leading to the extension lamps 46. A plug 14 of known type which is commonly used for insertion into the cigarette lighter socket in the dashboard of an automobile, is connected to terminals 11c and 11d of connector member 11, which terminals are in turn respectively connected to the positive and negative terminals 5 and 6. When desired, the portable lighting unit may be energized directly from an automobile battery by inserting the plug 14 into the cigarette lighter socket of an automobile.

The operation of the circuit for energizing the various lamps is obvious from the circuit shown in FIG. 3. With the clamps 7' and 8' mounted on the battery terminals, the cover closed and main switch 1 closed, the spotlight may be energized by closing switch 4. The extension lamps 46 may be energized by closing switch 3 provided switch 1 is first closed. In order to operate extension lamps 46 intermittently so as to provide a flashing warning, switch 2 is opened and switch 3 closed while switch 1 remains closed. When it is desired to utilize external power such as from an automobile battery by means of the plug 14, the switch 1 may be opened and the remaining switches operated in the aforesaid manner. The portable lighting unit of this invention as above described, is useful for many purposes in various locations as desired. As shown in FIG. 9 the unit may be placed on a boat with the extensible lamps 46 positioned at the sides of the boat to constitute running or warning lights and the spotlight 32 utilized whenever necessary or desired for signalling or search purposes.

This invention also contemplates the use of the portable lighting unit as a device to be mounted on a barricade usually employed as a warning to drivers of automobiles or to pedestrians of an approach to dangerous or hazardous conditions. Such barricade is shown in FIGS. 6 to 8 and is comprised of a pair of supports 50 upon which is removably mounted a rectangular box 52 having a base 54 and side walls 56. The ends of the base 54 extend endwise further than the side walls. The box may have an open top and be provided with a lid hinged to a side wall thereof. The portable lighting unit hereinbefore described may be placed within the open end of the box or it may be detachably mounted on the underside of the base 54 by means of spaced and inverted L-shaped brackets 58 secured to the lower surface of base 54, such brackets being spaced at a sufficient distance to receive between them the case 20. Bolts extending through the depending legs of the brackets are received in openings in the sides of the case 20 to support the latter. The base 54 is provided with an opening for permitting the lid of the case 20 to extend therethrough so that the manual switch controls on the upper surface of the lid 20 are accessible. The spotlight 32 may be removed, if desired, although this is not essential. The ends of the barricade box are respectively terminated by a translucent channel-shaped member 60 having an end wall 61 and side walls 62. When assembled to the barricade box the side walls 62 extend partly along the side walls of the box and are secured thereto by screws or bolts. The members 60 may be of translucent plastic or glass and preferably of a red color to provide a danger warning when illuminated.

Before mounting the casing 20 to the base member 54, the clamps or brackets 44 carrying the lamps 46 are removed from the sides of the portable battery casing 20 and inserted through the opening in the base 54 of the barricade. After mounting the case 20 with its lid within the opening in the base and inserting the bolts through the brackets 58 to support the case on the base, the clamps 44 are moved to position the lamps 46 within the area enclosed by the translucent members 60. When the lamps are energized, the translucent members are illuminated such that a warning is provided when observed from all directions. Either a steady warning or a flashing signal may be given by closing switches 1 and 3 or 1 and 2 as above described.

As disclosed, the portable lighting unit of this invention can be easily and economically constructed, the circuit and battery enclosed and protected from the atmosphere so that the unit can be used even in rain or in damp surroundings. The unit may be utilized for providing different types of lighting as desired and the extensible lamps can be located at distances from the power source in opposite directions and the entire device including the extensible lamps can be easily carried as a single unit. The use of the portable unit in connection with the barricade device hereinbefore described, is particularly advantageous, since barricades are normally used at one location for a short time and must be frequently moved.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A self-contained portable lighting unit including a casing for receiving a battery, a lid for the casing having a pair of electrically conductive main terminals secured to the interior surface thereof, means for connecting each of the terminals to the respective positive and negative terminals of a battery within the casing, a switch mounted on the lid and having a manual control accessible from the exterior thereof, a pair of lamp supporting devices detachably mounted on the unit, an electric lamp mounted on each of the devices, extendable conductors for each lamp passing through the lid from the exterior thereof, and means including said switch for connecting the extendable conductors to the main terminals to energize the lamps, said means for connecting the extendable conductors further including an intermittent circuit interruptor secured to the interior surfaces of the lid for causing said lamps to be intermittently energized to provide a flashing warning, said lamp supporting devices each comprising a channel shaped member having resilient arms for engaging opposite surfaces of the unit, the lamp being mounted on the web portion of the member.

2. A self-contained lighting unit as defined by claim 1, including a spotlight secured to the exterior surface of the lid, conductors for energizing the spotlight extending through the lid from the exterior thereof and a second manually operable switch mounted on the lid accessible from the exterior thereof for connecting the spotlight conductors to the main terminals for energizing the spotlight.

3. A self-contained portable lighting unit as defined by claim 2, the means for securing the spotlight to the exterior surface of the lid including a universally adjustable support for selectively positioning the beam from the spotlight in a desired horizontal and vertical direction.

4. A warning barricade device comprising an elongated base member having spaced parallel upright side walls attached thereto, a channel-shaped member of translucent material projecting from each of the ends of the device, the arms of the members being attached at their ends to the ends of the side walls, and a light source within the area embraced by each of the channel-shaped translucent members.

5. A warning barricade device as defined by claim 4 including a casing for housing the battery supported on the base member, a removable cover for the battery casing, a pair of electrical main terminals secured to the cover, a conductor secured to each of the terminals and having a clamp at one end for connection to a battery terminal, conductors passing through the exterior of the cover and connecting the main terminals to the light sources for energization thereof.

6. A warning barricade device as defined by claim 5, in which the battery casing is suspended from the base, said base having an opening therethrough for the passage fo the light source and their conductors, and cooperative means on the base and casing for detachably suspending the casing from the base with the cover in register with the opening in the base.

References Cited in the file of this patent

UNITED STATES PATENTS

| | | |
|---|---|---|
| 2,671,212 | Mingle | Mar. 2, 1954 |
| 2,684,476 | Trempe | July 20, 1954 |
| 2,816,277 | Salkowski | Dec. 10, 1957 |
| 2,903,688 | Sorenson | Sept. 9, 1959 |
| 2,918,668 | Stube | Dec. 22, 1959 |
| 2,931,026 | Nelson | Mar. 29, 1960 |
| 2,987,718 | Davis | June 6, 1961 |